United States Patent

Uomori et al.

[11] Patent Number: 6,094,270
[45] Date of Patent: Jul. 25, 2000

US006094270A

[54] RANGE FINDER

[75] Inventors: Kenya Uomori, Hirakata; Atsushi Morimura, Nara, both of Japan

[73] Assignee: Matsushita Electric Industrial Co., Ltd., Osaka, Japan

[21] Appl. No.: 09/206,606

[22] Filed: Dec. 7, 1998

[51] Int. Cl.⁷ .................................................. C01N 11/24
[52] U.S. Cl. ........................................................ 356/376
[58] Field of Search .................................... 356/375, 376

[56] References Cited

U.S. PATENT DOCUMENTS

| | | | |
|---|---|---|---|
| 4,349,277 | 9/1982 | Mundy et al. | 356/376 |
| 4,611,917 | 9/1986 | Robieux et al. | 356/376 |
| 5,880,846 | 3/1999 | Hasman et al. | 356/376 |
| 6,028,672 | 2/2000 | Geng | 356/376 |

FOREIGN PATENT DOCUMENTS 5-10736  1/1993  Japan .

OTHER PUBLICATIONS

K. Sato, "Recent Trends on 3D Range Imaging", Graduate School of Information Science, Nara InstituteOf Science and Technology, Feb. 12, 1994, pp. 209–215 (with partial English translation).

J. Tajima et al., "Range Image Acquisition by Rainbow Range Finder", Rainbow Range Finder, vol. J73–D–II, No. 3, pp. 374–382, 1990 (with partial English translation).

*Primary Examiner*—Richard A. Rosenberger
*Attorney, Agent, or Firm*—Ratner & Prestia

[57] ABSTRACT

A real-time range finder comprising light sources 12 and 13 for composing a plurality of light beams having different wavelength characteristics and sweeping the traveling direction of the composite light and either the wavelength or intensity of the light; a plurality of optical filters 15 and 16 for introducing light beams corresponding to wavelength characteristics of the plural light beams to charge-coupled devices; the charge coupled devices 20 and 21 arranged in accordance with the plural optical filters, respectively; a distance calculation unit 26 for calculating, from pixel values of image data obtained from the charge-coupled devices and from the sweep start time of the light sources, a time at which light is incident on the pixels, and calculating a distance to the subject. With such this finder, it is possible to measure a distance at real-time with a simple structure while using normal photo sensors which are not provided with time measurement functions.

18 Claims, 10 Drawing Sheets

$$t_0 = f^{-1}\left(\frac{I_{A0}}{I_{B0}}\right)$$

RANGE FINDER

BACKGROUND OF THE INVENTION

1. Field of the Invention

The present invention relates to a range finder for measuring the three-dimensional position of a subject.

2. Description of the Related Art

Conventional range finders involve, for example, a finder shown in FIG. 9A. This is designed to irradiate a subject with a longitudinally linear light (or slit light), to sweep the light in the transverse direction and to capture the reflected light thereof to thereby measure the three-dimensional position of the entire subject. Description will be given to the operation in more detail using FIG. 9B.

Light from a light source 3 is formed into longitudinally linear slit light by a slit 10. The slit light is swept by a rotating mirror 4 such that the projection direction of the slit light is horizontal to the subject 11. The rotating mirror 4 is rotated at an angular velocity of ω by a rotation control unit 5. The reflected light from the subject 11 is received through a lens 1 by a photosensor array 2 wherein photosensors are arranged two-dimensionally. At this time, a time period t from the sweep start time to the time the light reaches the respective photosensors on the photosensor array 2, is measured by a timing measurement unit 6. The projection direction of the slit light $\theta(t)=\omega \cdot t$ at a time when the light reaches the respective photosensors can be thus obtained.

Using the principle of the tigonometrical survey as well as the projection direction θ and the positions of photosensors, the three-dimensional position of a point P on the subject is measured by a distant calculating unit 7.

Now, the principle of measuring the three-dimensional position of the point P will be described in a more concrete manner.

A dashed line 901 shown in FIG. 9B denotes the reset position of a rotation angle (that is, the reset position is defined as sweep start time.) For the sake of simple description, a case where the point P on the subject 11 is on the space of FIG. 9B will be also described. In this case, the point P, the center of the lens 1 and the dashed line 901 are assumed to be on the same plane.

The angle $\theta_2$ (or $\theta_i$) made between the line of sight from a light-receiving unit of a photosensor $S_2$ (or $S_i$) among n photosensors $S_1, S_2, \ldots, S_n$ shown in FIG. 9B, to the center of the lens 1, and an optical axis 902 is a fixed angle as shown in FIG. 9B. As for this angle, the same thing is true of other photosensors and it is determined for every photosensor in a design phase.

First, as shown in FIG. 9B, the time at which a photosensor $S_2$ receives a reflected light from the point P is set at $t_2$. The time $t_2$ corresponds to a time period for the rotating mirror 4 rotates from the reset position by an angle of ω. At time $t_2$, $\theta(t_2)$ can be expressed by formula 1 as follows:

[Formula 1]

$$\theta(t_2)=\omega \cdot t_2$$

Other photosensors have the same relationship. It is noted that a distance from the lens 1 to the rotating mirror 4 is known.

By calculating an angle θ(t) for every photosensor $S_i$ using the formula 1, it is possible to measure three-dimensional positions of respective points on the subject 11 in relation to the range finder by using the calculated angle θ(t), the angle θi and the distance from the lens 1 to the center of the rotating of the mirror 4, based on the principle of the tigonometrical survey.

In case of using the conventional range finder as described above, however, it is required to measure a time at which light reaches the respective photosensors $S_i$ and to provide time measuring means with the photosensors, respectively. Furthermore, to obtain a resolution of an ordinary distance image, it is required to make photosensor strings into integrated circuits (ICs) and to provide peripheries of the photosensors with time measuring circuits, respectively so as to improve resolutions of the photosensors. Thus, quite high integration is needed. Due to this, dedicated ICs have to be fabricated to realize the system, which makes, in turn, the realization of the system disadvantageously difficult.

SUMMARY OF THE INVENTION

An aspect of the present invention is a range finder comprising:

light source means having a light source for emitting light onto a subject, for sweeping a light projection direction from the light source;

change control means for changing said light projection direction and characteristics of the light based on a preset correspondence rule between changes of said light projection direction and changes of said characteristics of the light image pick-up means for receiving a reflected light of a light beam emitted onto said subject and for obtaining image data;

distance calculation means (1) for determining said characteristics of the light from pixel values of the image data obtained by said image pick-up means, (2) for specifying said projection direction of the light which is incident on pixel corresponding to the pixel values based on said rule and result of said determination, and (3) for calculating a distance to said subject while using said specified projection direction.

Another aspect of the present invention is a range finder according to said 1st invention, wherein said characteristics of light are one of intensity of said light and wavelength characteristics of said light.

Yet another aspect of the present invention is a range finder comprising:

a light source unit generating a composite light beam from a plurality of light beams having different wavelengths and sweeping a direction in which the composite light beam is projected onto a subject;

change control means for changing the projection direction of said composite light beam and composition ratio of intensities of said plurality of light beams based on a preset correspondence rule between changes of the projection direction and changes of the composition ratio of intensities of said plurality of light beams;

a plurality of optical filters selecting a transmitted light beam in accordance with wavelength characteristics of said plurality of light beams reflected by said subject;

image pick-up devices arranged in accordance with said plurality of optical filters, respectively;

a distance calculation unit (1) for determining said composition ration of intensities of the plurality of the light beam from pixel values of the image data obtained by each said image pick-up means, (2) for specifying said projection direction of the composite light beam which is incident on pixel corresponding to the pixel values based on said rule and result of said determination, and (3) for calculating a distance to said subject while using said specified projection direction.

Still another aspect of the present invention is a range finder wherein said light source unit has a first period serving as a period in which said composite light is changed into slit light and sweeping the slit light, and a second period in which a composition ratio of said plurality of intensities of light beams does not change with the times, the composite light beam being projected onto an entirety of said subject during said first and second periods;

said change control means controls said light source unit such that the both first and second periods are alternately repeated with the times;

said distance calculation unit calculates reflectance of a surface of said subject from pixel values of image data obtained from said image pick-up devices, and utilizes calculation results for specifying said projection direction.

A further aspect of the present invention is a range finder comprising:

a light source unit sweeping a projection direction of a light beam projected onto a subject;

change control means for changing said light projection direction and wavelength characteristics of said projected light beam based on a preset correspondence rule between changes of said projection direction and changes of said wavelength characteristics;

a plurality of optical filters for photo-decomposing a light beam emitted from said light source unit, reflected by said subject and incident on pixels;

image pick-up devices for obtaining image data from images photo-decomposed by said plurality of optical filters;

a distance calculation unit (1) for determining said wavelength characteristics of the light beam from pixel values of the image data obtained by said image pick-up means, (2) for specifying said projection direction of the light which is incident on pixel corresponding to the pixel values based on said rule and result of said determination, and (3) for calculating a distance to said subject while using said specified projection direction.

A still further aspect of the present invention is a range finder wherein said light source unit has a first period serving as a period for changing said light beam into slit light and sweeping the slit light, and a second period in which wavelength characteristics and intensity of said light beam do not change with the times;

said change control means controls said light source unit such that the first and second periods are alternately repeated with the times;

said distance calculation unit calculates reflectance of a surface of said subject from pixel values of image data obtained from said respective image pick-up devices in said second period, and utilizes calculation results for specifying said projection direction.

A yet inventions, of the present invention is a range finder wherein the wavelength of said emitted light beam is set in a range other than a visible range;

another image pick-up device for picking up a texture image of said subject simultaneously with pick-up operation by said image pick-up devices; and texture information about said subject is outputted simultaneously with information about a distance to said subject.

A still yet further aspect of the present invention is a range finder wherein said change control means sets a period in which distance measurement is conducted and a period in which distance measurement is not conducted in a time-division manner;

in said period in which distance measurement is not conducted, emission of said light by said light source unit is stopped, a texture image of said subject is picked up by said image pick-up devices and said texture information is outputted simultaneously with information about a distance to said object.

Another aspect of the present invention is a range finder wherein said light source unit varies said change of a composition ratio of said plurality of light beams for every measurement period.

Yet another aspect of the present invention is a range finder wherein said light source unit varies said change of wavelength characteristics of said light beams for every measurement period.

The present invention has been made in view of the above disadvantages of the conventional range finder. It is, therefore, an object of the present invention to provide a real time finder capable of dispensing with any special sensors for allowing the photosensors to provide time measuring functions, respectively and of measuring a distance at real-time with a far simpler structure using the known technique.

EXPLANATION OF THE REFERENCE NUMERALS

Figure 1:
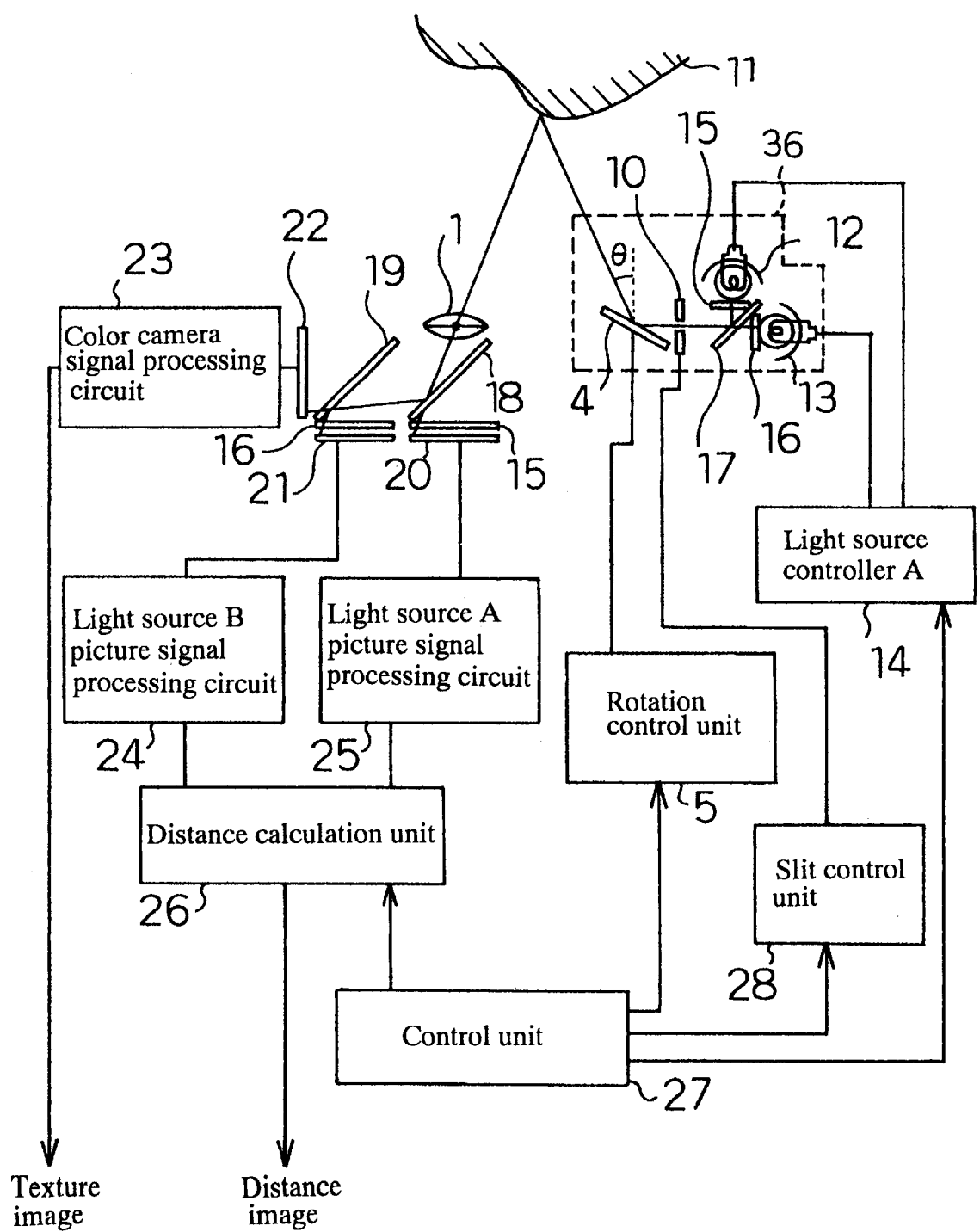
FIG. 1 is a block diagram of a real-time range finder in the first embodiment according to the present invention.

1 Lens
4 Rotating mirror
5 Rotation control unit
6 Timing measurement unit
10 Light slit
11 Subject
12 Light source A
13 Light source B
14 Light source controller A
15 Filter A
16 Filter B
17 Half mirror A
18 Half mirror B
19 Half mirror C
20 CCD (charge-coupled device) A
21 CCD (charge-coupled device) B
22 CCD (charge-coupled device) C
23 Color camera signal processing circuit
24 Light source B picture signal processing circuit
25 Light source A picture signal processing circuit
26 Distance calculation unit
27 Control unit
28 Slit control unit
29 TDL (tunable diode laser) control unit
30 Wavelength tunable semiconductor laser
31 White light source
32 Light source controller B
33 Color camera device
34 Distance calculation unit B
36, 46 Light source unit
37 Rotating mirror B
38 Ligth transmittance tunable filter

DESCRIPTION OF THE EMBODIMENTS OF THE INVENTION

The embodiments of a range finder according to the present invention will be now be described with reference to the drawings.

[First Embodiment]

FIG. 1 is a block diagram showing a real-time range finder in the first embodiment according to the present invention.

In FIG. 1, a reference numeral 1 denotes a lens, 4 a rotating mirror, 5 a rotation control unit, 11 a subject, 12 a light source A, 13 a light source B, 14 a light source controller A, 15 a filter A, 16 a filter B, 17 a half mirror A, 18 a half mirror B, 19 a half mirror C, 20 a charge-coupled device or CCD A, 21 a charge-coupled device or CCD B. 22 a charge-coupled device or CCD C, 23 a color camera signal processing circuit, 24 a light source B picture signal processing circuit, 25 a light source A picture signal processing circuit, 26 a distance calculation unit, 27 a control unit and 28 a slit control unit.

It is noted that a variation control means in the present invention includes the control unit 27, the rotation control unit 5, the light source controller A 14 and the like.

The operation of the real-time range finder with the above structure in this embodiment will be described.

Figure 2:
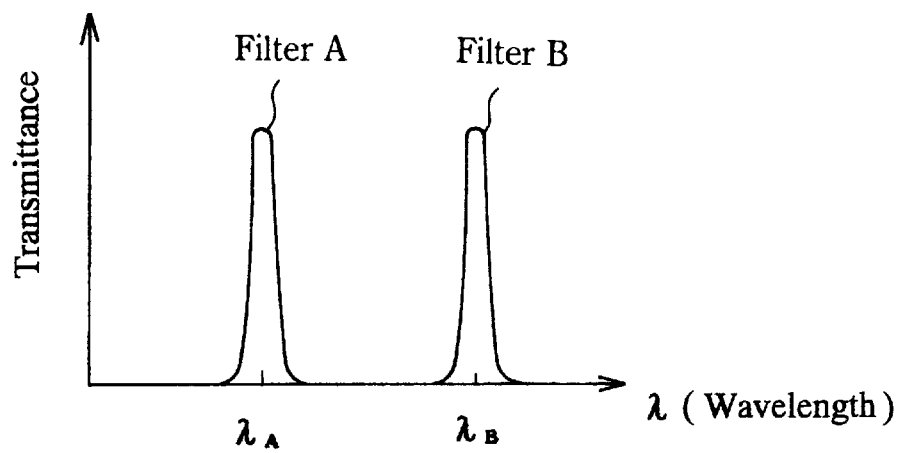
FIGS. 2A and 2B are characteristic views of optical filters in the first embodiment according to the present invention.
Figure 2:
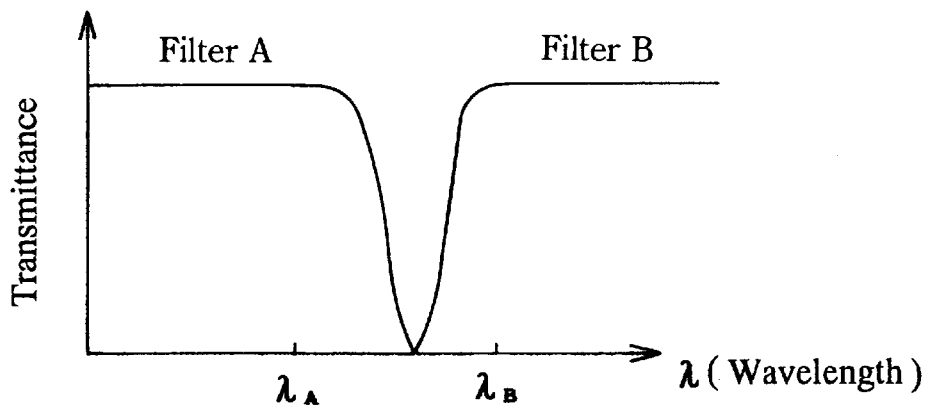

First, in the light source unit 36, light beams of the light source A 12 and the light source B 13 are passed through a filter A and a filter B, respectively, and the light beams are composed by the half mirror A 17. The characteristics of the filters A and B are as illustrated by FIG. 2A wherein light beams having different wavelengths are selected and passed. Alternatively, as shown in FIG. 2B, two types of light beams may be separated by the magnitude of the wavelength may be possible.

Next, the thus composite light is formed into a longitudinal linear slit light by the slit 10, reflected by the rotation mirror 4 and emitted. The emitted light is swept in the transverse direction of the subject by the rotating mirror 4 controlled by the rotation control unit 5. The swept light is irradiated on the subject 11 and the reflected light thereof is incident on the charge-coupled device A (20), the charge-coupled device B (21) and the charge-coupled device (22) by the lens 1, the half mirror B (18) and the half mirror C (19).

At this time, the charge-coupled devices A and B are equipped with the filter A (15) and the filter B (16), respectively as shown in FIG. 1 to allow the composite light of the light sources A (12) and B(13) to be separated from each other and received.

Normally, the light sources A (12) and B (13) are set to be within an infrared range and a distance is thereby measured. The charge-coupled device C receives light within a visible range and the texture of the subject is picked up by the color camera signal processing unit 23. Differently from this, if filter characteristics of the charge-coupled devices A and B are set within a visible range, the image pick-up time of the CCDs A and B is set to be different from that of the CCD C, that is, on a time-division basis, if the CCDs A, B and C operate in accordance with this, then it is not necessary to set the light sources within the infrared range. The reason such a device is required is as follows. In this embodiment, light intensity used in calculating a distance is swept while being changed with the times. If the light having changing intensity is received during the period in which light intensity us changing, and the texture of the subject is picked up, then the density of the texture image is changed in accordance with the changed intensity, resulting in an unnatural image.

Figure 3A:
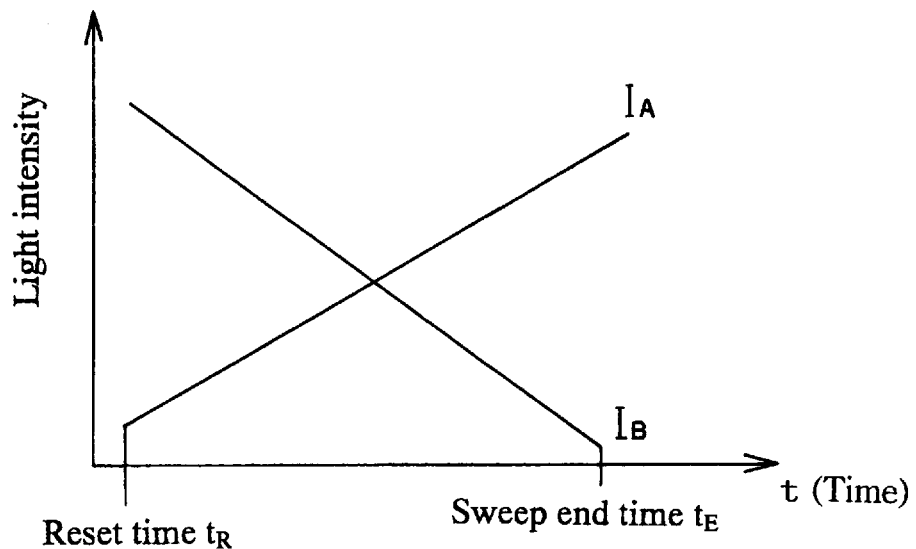
FIGS. 3A and 3B show operations of respective light sources in a light source unit in the first embodiment according to the present invention.
Figure 3B:
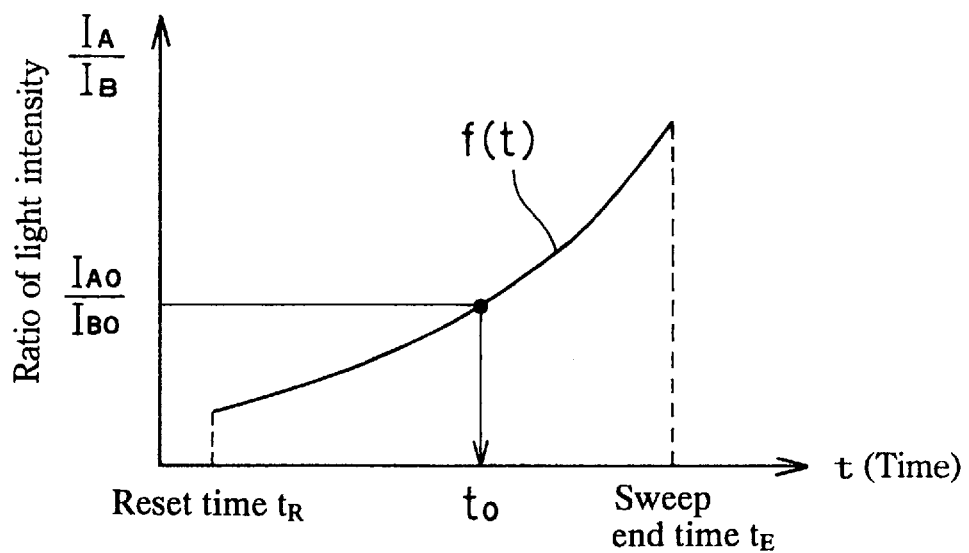

In the meantime, the light source controller A (14) changes the light intensities of the light sources, respectively, in accordance with the sweep of composite light by the rotating mirror 4, as shown in FIG. 3A. At this time, the ratio of the light intensities changes as shown in FIG. 3B. This ratio is measured by the charge-coupled devices A and B. The sweep time of the reflected light is measured by the distance calculation unit 26.

FIG. 3B indicates that, while the light intensity ratio is Ia/Ib (on the axis of ordinates), sweep time $t_0$ (on the axis of abscissas) at the light source unit 36 from which the light beams of such intensities are irradiated, can be calculated. In FIG. 3B, reference symbols Ia and Ib denote the intensities of light beams from the light sources A and B, respectively.

If the function of Ia/Ib is defined as f(t) (that is, Ia/Ib=f(t)), t can be expressed by formula 2 as follows:

[Formula 2]

$$t = f^{-1}(Ia/Ib)$$

The preset rule of the present invention includes, for example, this function f(t), reset time and sweep end time.

On the other hand, the reset time ($t_R$), the sweep end time ($t_E$) are retained and managed by the control unit 27. In response to a command from the control unit 27 based on these pieces of time information, the rotation control unit 5 causes the rotating mirror 4 to rotate at a constant angular velocity of ω and the slit control unit 28 determines the shape of the slit. In this case, the slit is set to constantly provide linear light.

Thereafter, the distance calculation unit 26 obtains light intensity ratios (Ia/Ib) at the positions of photosensors (i.e., for pixels) based on the intensities of the light beams having different wavelengths (Ia, Ib) received by the photosensors (which are arranged in an array in the charge-coupled devices A and B) from the output of the light source A picture signal processing unit 25 and from that of the light source B picture signal processing unit 24, respectively.

Using the thus obtained light intensity ratios, time $t_0 = f^{-1}$ (Ia/Ib) in which light beam have been incident is calculated by the characteristics shown in FIG. 3B (that is, by using formula 2).

Using the time $t_0$, the reset time and the sweep end time, the direction θ (which can be expressed by the outgoing angle of the slit light; θ(t)=ωt) of the light radiated from the light source unit 36 is calculated. Based on the principle of the tigonometrical survey, the three-dimensional position of a portion on the subject reflected on the position of each pixel is calculated. The outgoing angle θ of the slit light at the reset time $(t_R)$ is $\theta(t_R)=0$ and that at the sweep end time $(t_E)$ is $\theta(t_E)=90°$. The values of $\theta(t_R)$ and $\theta(t_E)$ can be adjusted.

As a result, the distance image of the subject can be obtained. At the same time, the texture image of the subject corresponding to the obtained distance image can be obtained from the output of the charge-coupled device C 22 and that of the color camera signal processing unit 23.

What has been described above refers to the operation of the real-time range finder in a case where the reflectance characteristics of the surface of the subject do not depend on wavelengths of light beams.

Normally, the reflectance characteristics of the surface of the subject do depend on wavelengths of light beams.

Figure 4:
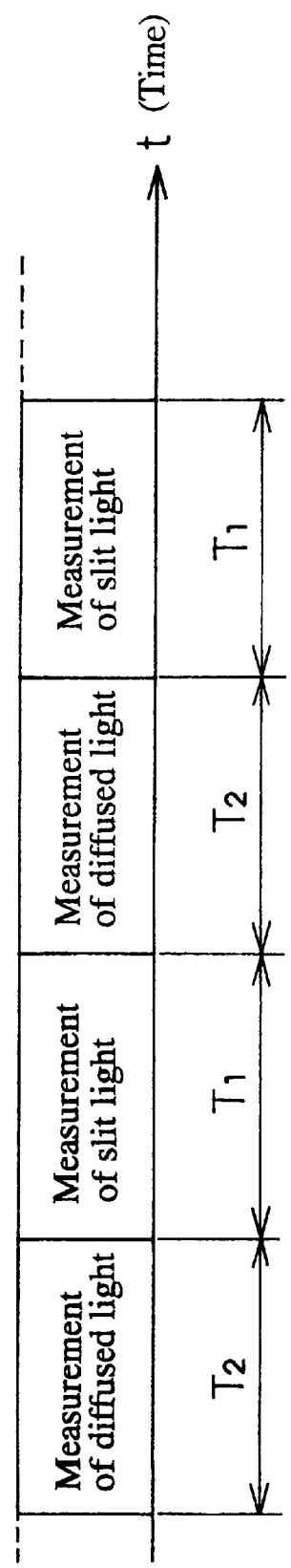
FIG. 4 shows time-division processing in the first embodiment according to the present invention.

In view of this, the structure in which the slit light having an intensity changing with the times (time period T1) and uniform light having an intensity which is not changed with the times (to be referred to as diffused light) (time period T2) are alternately repeated as the light from the light source unit 36 as described above. With such a structure, even if the reflectance of the surface of the subject depends on the wavelengths of light beams, distances can be measured correctly. In FIG. 4, the time axis is given in the right of the axis of abscissas. Due to this, time periods T2 and T1 on the left correspond to the first output of the distance calculation unit 26. The time periods T2 and T1 on the right correspond to the second output thereof. It is noted that the first period of the present invention corresponds to the time period T1 in which light intensity is changed with the times and that the second period of the present invention corresponds to the time period T2 in which the light intensity is not changed with the times. In this embodiment, T1 is ⅟60 seconds or ⅟30 seconds. So is T2.

In that case, the operation of measuring the slit light is basically the same as that as described before.

The method for calculating time $t_0$ in the distance calculation unit 26 is, however, slightly different from that described before.

Namely, the slit 10 is removed from the light source unit 36 and ratios of the output of the light source A picture signal processing unit 25 and that of the light source B picture signal processing unit 24 when uniform light is projected onto the subject or when diffused light is measured, are calculated for the photosensors, respectively. The ratios of the surface reflectance of the respective light sources are calculated and used as correction coefficients.

Next, in calculating the time $t_0$, the light intensity ratio Ia/Ib is multiplied by the above correction coefficients. Based on the obtained value, $f^{-1}$ (Ia/Ib×correction coefficients) is calculated for the output of every photosensor by formula 2, thereby measuring more correct light receiving time.

In this way, an error resulting from the dependency of the surface reflectance of the subject on the wavelengths of light beams is corrected. Based on the correction as well as the sweep start time and sweep end time, the three-dimensional position of the subject is calculated using the principle of the tigonometrical survey.

In the first embodiment, the operation for linearizing a light beam from the light sources A12 and B13 by the slit 10 and that for irradiating a uniform light beam may be made by mechanically realizing the operation of placing the slit on optical paths by, for example, a motor. Alternatively, they may be realized by a pattern formed on a liquid crystal panel.

In the first embodiment, if a light beam in an infrared range is used as slit light, a texture image can be picked up by the color camera device 23 simultaneously with the measurement of a distance image. A texture image may be picked up by time-division processing at timing other than that at which the slit light is emitted while the slit light is being set in a visible range.

In the first embodiment, description has been given to a case where the light sources A 12 and B 13 are lamp-like sources. Laser light beams may be used instead. In the latter case, transmit wavelengths of laser light beams are set differently from one another and corresponding filters are installed on the charge-coupled devices, respectively. In that case, a filter at the light source unit 36 may be omitted. If two types of wavelengths are set very close to each other and the surface reflectance of the subject is not sharply changed by wavelengths of light beams, a highly accurate distance image can be measured without the need to measure diffused light.

Moreover, in the first embodiment, two types of light sources are used. It is possible to use two or more types of light sources to receive light independently of each other, and to calculate a time at which light is irradiated based on the light intensities at the photosensors, respectively.

Furthermore, in the first embodiment, the light intensity of light beams of respective light sources in the light source unit 36 are swept in directions such that the intensity of the light beam from the light source A increases and that of the light source B decreases. It is possible to reverse the sweep directions of the light intensity of light beams from the respective light sources to thereby improve the accuracy of distance measurement. In such a case, a highly accurate measurement result may be outputted by a filtering method such as average processing and median processing using a plurality of continuous distance measurement results. In the embodiment, the light intensity is swept rectilinearly. It may be swept into any time-based waveforms and the waveforms tunable with the times of light intensity may be changed every time distances are measured.

As described above, according to this embodiment, it is possible to realize a range finder capable of measuring a distance easily at real-time without preparing sensors for providing the respective photosensors with time measurement functions by changing the irradiated light with the times using the known technique.

Furthermore, it is possible to realize a range finder capable of measuring a distance including less interfering background light because of picking up only the light being within a wavelength range of the light emitted from the light source unit 36 by using the charge-coupled devices A(20) and B(21).

[Second Embodiment]

Figure 5:
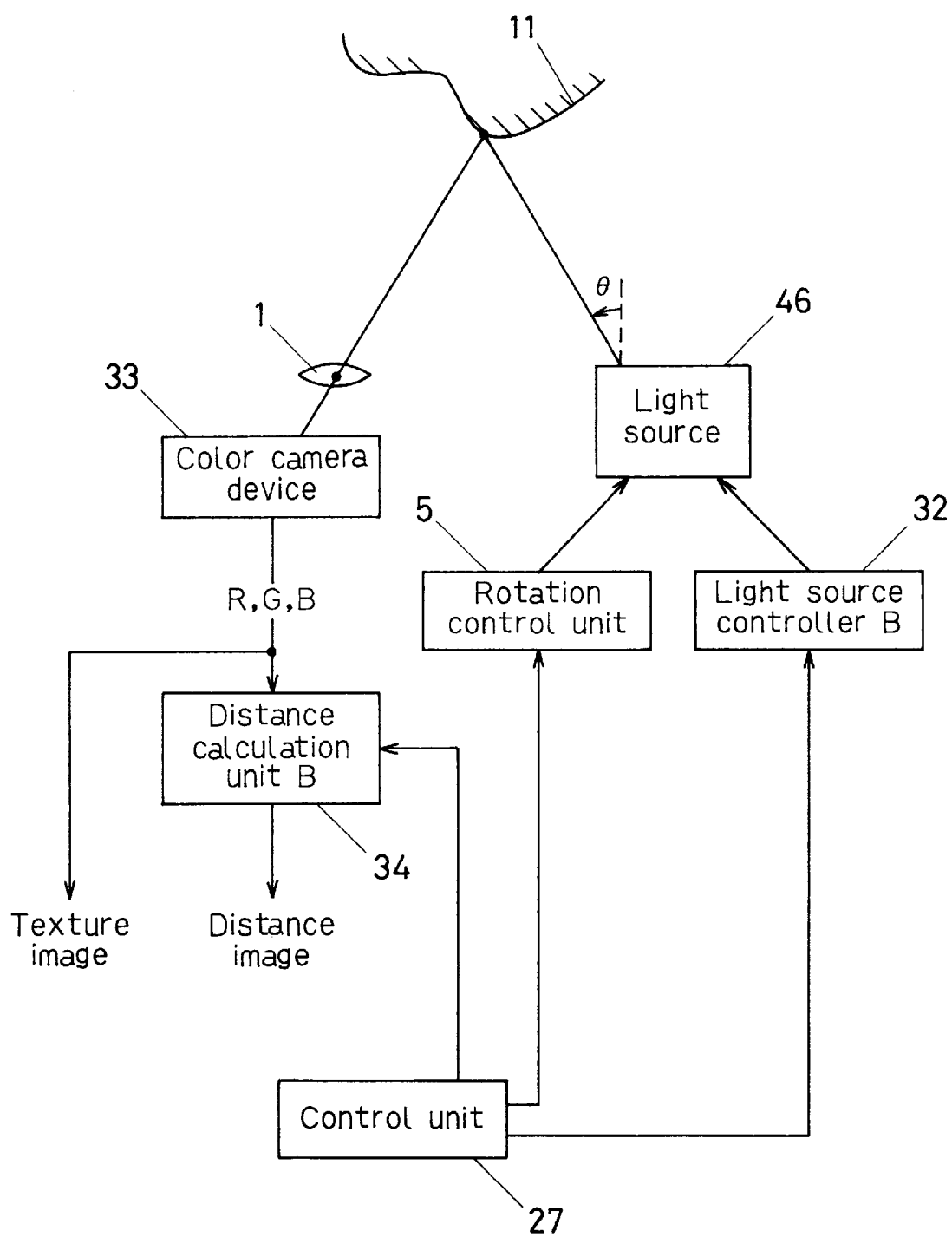
FIG. 5 is a block diagram of a real-time range finder in the second embodiment according to the present invention.

FIG. 5 is a block diagram showing a real-time range finder in the second embodiment according to the present invention.

In FIG. 5, the same elements as those in the first embodiment are denoted by the same reference numerals and symbols. The second embodiment differs from the first embodiment in a light source controller B (32), a distance calculation unit B (34), a color camera device (33) and a light source unit 46. The main differences from the first embodiment lie in, in particular, that slit light is swept and, at the same time, the wavelength of the slit light is changed continuously with the times in the light source unit 46. In this embodiment, the intensity of the slit light is constant. The change control means of the present invention is means including, for example, the control unit 27, the rotation control unit 5 and the light source controller B (32).

The operation of the real-time range finder with such a structure in this embodiment will now be described below.

The light source unit 45 will be first described with reference to FIGS. 6A through 6C.

Figure 6A:
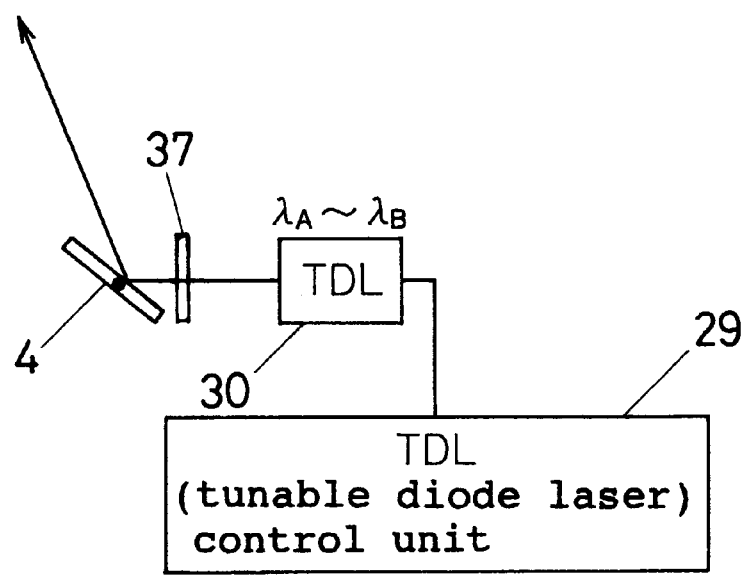
FIG. 6A is a detailed view showing the first structure of a light source unit in the second embodiment according to the present invention.

FIG. 6A shows the first structure of the light source unit 46. In FIG. 6A, a tunable diode laser or TDL 30 capable of continuously changing wavelength of light beams with the times (which operation is referred to simply as the sweep of wavelengths of light beams) is used as a light source. The oscillating wavelength of the TDL 30 is controlled by a TDL control unit 29. FIG. 6C shows a state in which wavelengths of light beams are swept. The sweep of wavelengths of light beams starts from a wavelength $\lambda_A$ at the reset time to a wavelength $\lambda_B$ at the sweep end time.

A light beam from the TDL 30 is moved in a longitudinal direction by a rotating mirror 37 for generating a slit light to thereby generate a slit-like light beam and the slit-like light beam is swept in a transverse direction by the rotating mirror 4. At this time, the rotating mirror 37 for generating slit light may be replaced by a hog-backed lens for dispersing light only in a longitudinal direction.

Figure 6B:
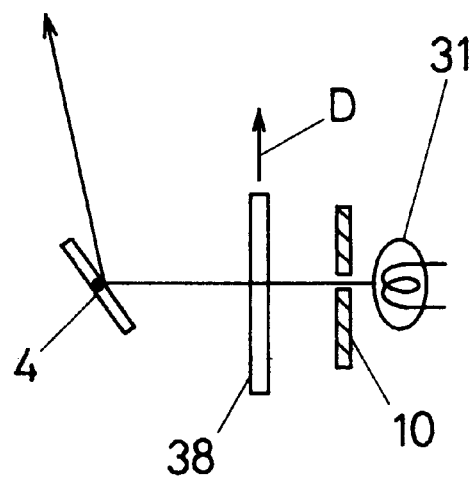
FIG. 6B is a detailed view showing the second structure of the light source unit in the second embodiment according to the present invention.

It is noted that the same operation can be realized by the second structure shown in FIG. 6B. In this case, a white light source 31 is passed through the slit 10 and slit-like light is generated. The sweep of the wavelengths of light beams can be conducted by passing the slit light through the transmittance tunable filter 38 which moves in a direction perpendicular to the slit light (a direction indicated by an arrow D in FIG. 6B). The transmittance tunable filter 38 has a structure as shown in FIG. 7 wherein light transmittance characteristics differ in the direction of the arrow D (horizontal direction in the drawing).

Figure 6C:
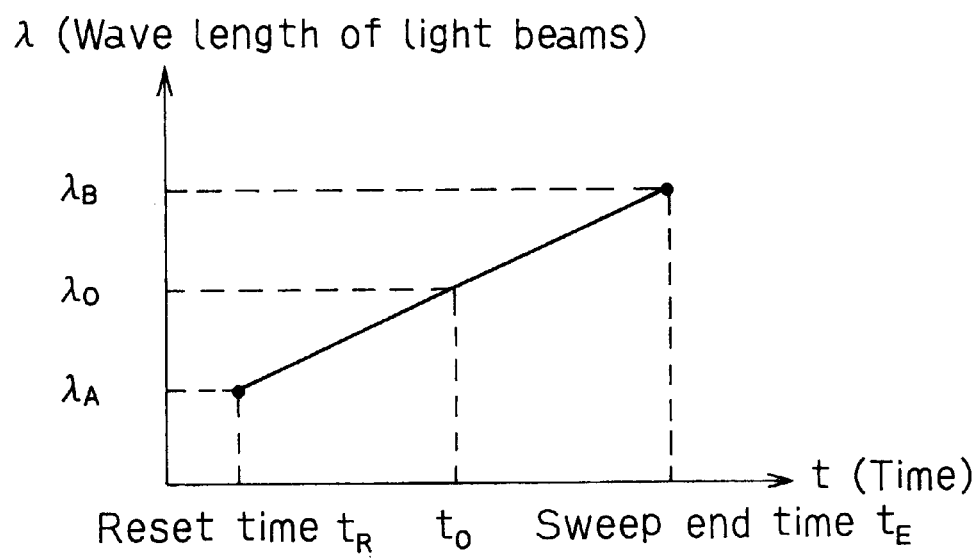
FIG. 6C shows the sweep of the light sources in the light source unit.
Figure 7:
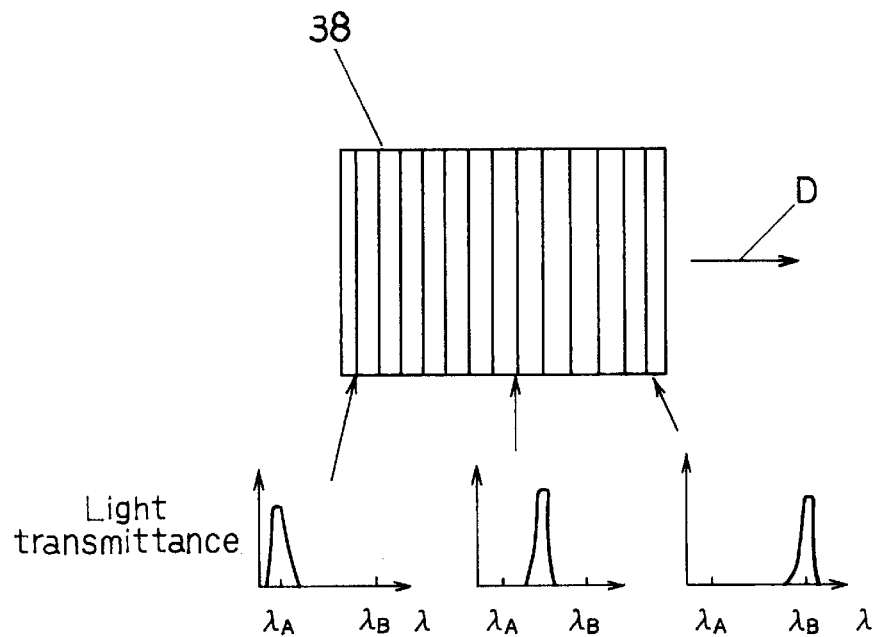
FIG. 7 shows the structure of a light transmittance tunable filter in the second embodiment according to the present invention.

That is, in the light transmittance tunable filter 38 shown in FIG. 7, a light beam of a wavelength of $\lambda_A$ is transmitted on the left end. As the position moves in the horizontal direction, the wavelength of the transmitted light changes and a light beam of a wavelength of $\lambda_B$ is transmitted on the right end. With such a structure, it is possible to sweep the wavelength of the slit light as shown in FIG. 6C.

Next, the swept light is irradiated on the subject 11 and the reflected light thereof is incident on the lens 1 and the color camera device 33 (see FIG. 5). At this time, the color camera device 33 is designed to receive the light reflected at the subject and emitted from the light source unit 46 after separating colors thereof. Color components of the reflected light from the subject on pixels are outputted, respectively. In other words, if used in a visible range, color components are separated by three types of color filters, i.e., R, G and B color filters. If used in an infrared range, color components are separated by a plurality of filters of colors in the infrared range.

Here, the light source controller B (32) causes wavelength of light beam of the light source to change with the times in accordance with the sweep of the slit light by the rotating mirror 4 (that is, in accordance with the change of the outgoing angle θ of the slit light) as shown in FIG. 6C. The wavelengths of the light beams are measured by the color camera device 33, whereas the distance calculation unit 34 measures a time for the reflected light of the subject 11 to be swept.

In the color camera 33, for example, three types of wavelength transmittance characteristic filters are arranged in front of the three charge-coupled devices, respectively and images seen with the respective wavelength characteristics are picked up. To be specific, a CCD color camera is prepared for measurement in a visible range. For measurement in an infrared range, plural types of spectral filters in that range are prepared.

Three types of pixel values are measured for pixels of the three types of charge-coupled devices, respectively and the wavelength of light beam of the light source is estimated from the combination of the pixel values. That is, for respective wavelength of slit light changed with the times, the ratio of the values of each light beam transmitted by the each type optical filter of the above-stated three types optical filters, are calculated in advance. By so doing, it is possible to estimate wavelengths of light beams of the light source based on which light beam of which ratio is measured. In this case, since a plurality of optical filters having different characteristics are required, the measurement can be made with two or more filters. As described above, the ratio has been calculated in advance and a light beam has a single wavelength on a position of each pixel. Due to this, distances can be calculated accurately even if the transmittance characteristics of the surface of the subject are dependent on the wavelengths of light beams.

As described above, if the wavelength of a light beam received by a certain pixel in the color camera device 33 is estimated as $\lambda_0$, the sweep time $t_0$ of the light beam of the wavelength $\lambda_0$ can be calculated from the relationship between the wavelength (on the axis of ordinates) and the sweep time (on the axis of abscissas). Based on the result, the outgoing angle θ of the slit light emitted from the light source unit 46 shown in FIG. 5 for every pixel of an image obtained by the color camera device 33.

In the meantime, the reset time and sweep end time are managed by the control unit 27. The distance calculation unit B (34) calculates a time $t_0$ at which the slit light is incident on a pixel from these pieces of time information and from a plurality of color component detection results outputted from the color camera device 33, as described with reference to FIG. 6C. The outgoing angle θ of the slit light is then calculated. Using them and information about the outgoing position of the slit light and about the lens position, the three-dimensional positions of respective portions of the subject 11 shown on the corresponding positions of the pixels are calculated under the principle of the tigonometrical survey. As a result, the distance image of the subject 11 can be obtained.

Figure 8:
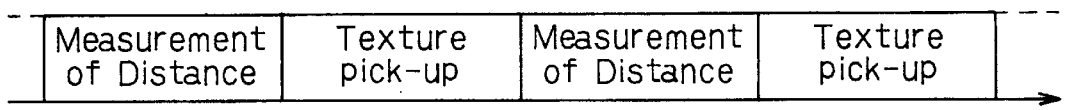
FIG. 8 shows time-division processing in the second embodiment according to the present invention.
Figure 9A:
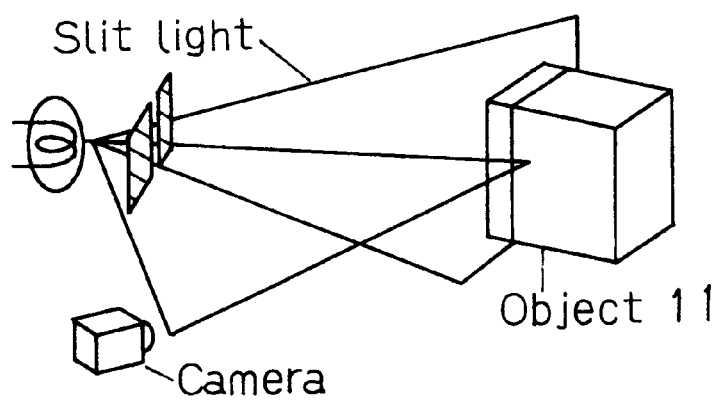
FIG. 9A is a schematically perspective view of a conventional range finder.
Figure 9B:
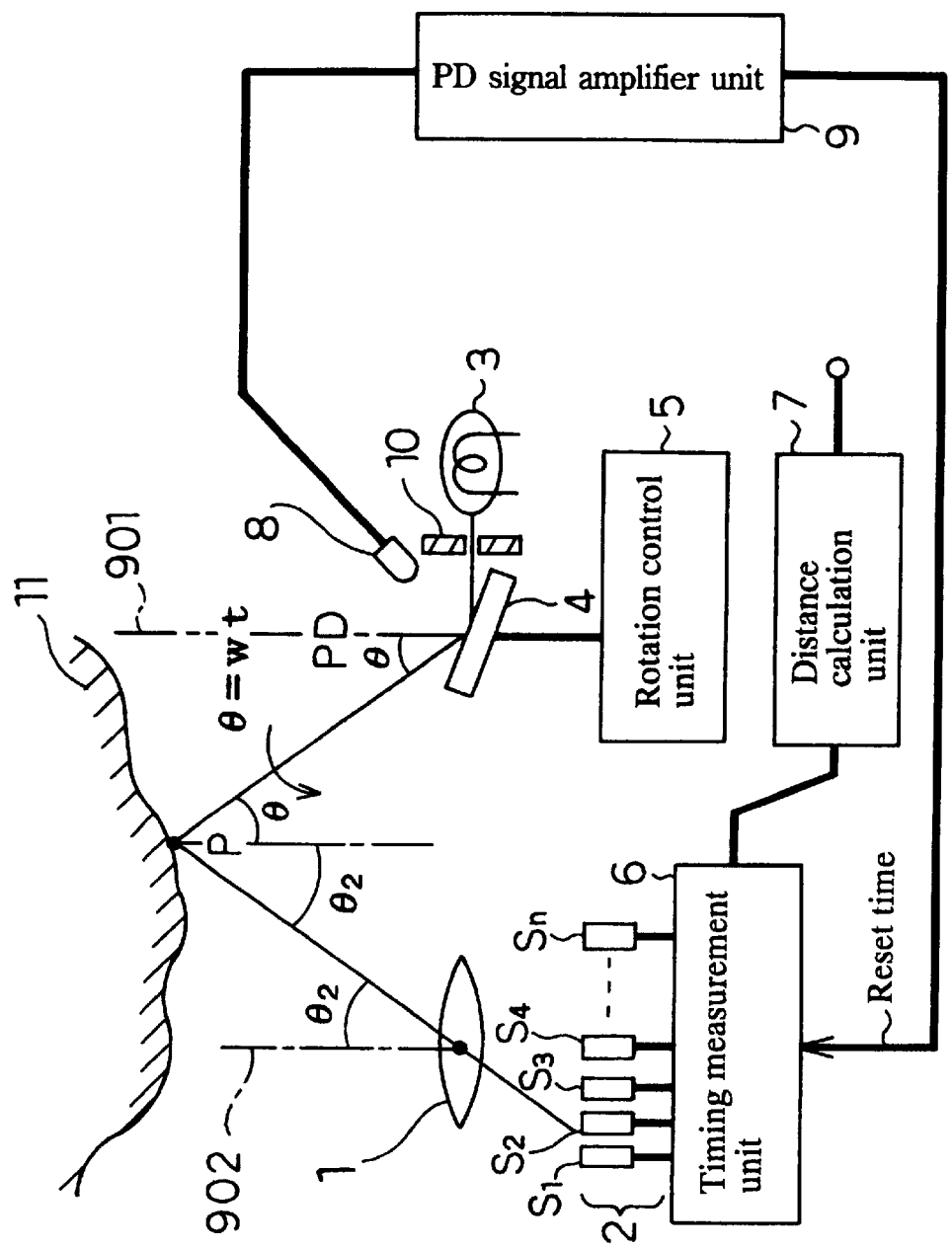
FIG. 9B is a block diagram of the conventional range finder.

While the above-stated operation is being conducted, another color camera device may be arranged on the same optical axis as that of the color camera device 33 using a half mirror and a prism other than the color camera device 33, to thereby input the texture image of the subject 11. In that case, however, slit light is required to be set within an infrared range and the color camera device 33 requires using a plurality of color filters for allowing colors in the infrared range to be separated. If the slit light is visible light, a normal color camera device is used for measuring a distance. As shown in FIG. 8, the texture image of the subject 11 is not inputted and only the distance image thereof is measured when the slit light is swept. The sweep of the split light is thereafter stopped and the texture image of the subject 11 is inputted. These series of operations are alternately conducted in a time-division manner.

In the second embodiment, wavelengths of light beams from the light source unit 46 are changed rectilinearly. They may be changed in any types of time variable waveforms. In addition, the wavelengths may changed every time a distance is measured and measurement strongly resistant to noises may be conducted. In this case, using a plurality of continuous distance measurement results as well as a filtering method such as average processing and median processing, highly accurate distance measurement results may be outputted.

The second embodiment illustrates a case where the ratios of wavelengths of light beams from the light sources after the light beams have been transmitted by the optical filters, respectively are calculated in advance. By so doing, based on which light of which ratio has been measured, the wavelengths of the light beams from the light sources are estimated. However, the present invention should not be limited to this embodiment. It is also possible to estimate the wavelengths of the light beams from the light sources by using the relationship of the magnitudes of the wavelengths of the respective light beams after transmitted by the optical filters, respectively. In the latter case, however, it is required to set the time period T2 (see FIG. 4) as described in the first embodiment and to conduct correction processing in the distance calculation unit using the correction coefficient obtained by irradiating a uniform light beam having a constant wavelength, in order to realize distance measurement with an accuracy close to that described in the second embodiment, even if the reflectance characteristics of the surface of the subject depend on the wavelengths of the irradiated light beams. Namely, the operation with such a structure is basically the same as that described with reference to FIG. 4 in the first embodiment. In that case, however, it is requisite that the wavelength of the irradiated light beam in the time period T2 is close to that in the time period T1. More specifically, in FIG. 5, there are provided not only the first period (corresponding to T1 in FIG. 4) serving as a period in which a light beam is formed into a slit light and swept but also the second period (corresponding to T2 in FIG. 4) in which the wavelength characteristics and intensity of the light beams do not change with the times in the light source unit 46. The control unit 27, the rotation control unit 5 and the light source controller B (32) (which control units correspond to the change control means according to the present invention) control the light source unit 46 such that both the first and second periods are alternately repeated with the times. The distance calculation unit B (34) calculates the reflectance of the surface of the subject 11 from values of pixels of the image data obtained from the respective charge-coupled devices in the second period. The calculation results are utilized when specifying the above time $t_0$ or specifying the projection direction of a light beam.

Figure 6D:
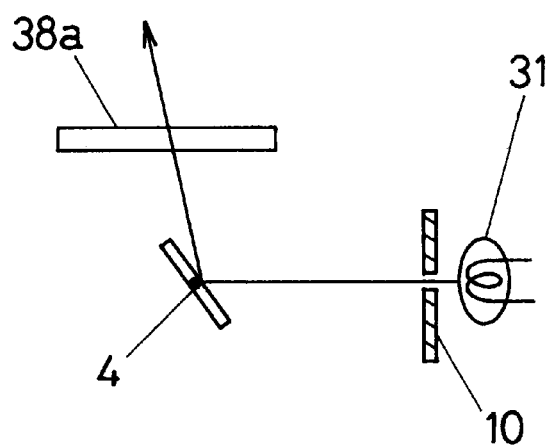
FIG. 6D is a detailed view showing the third structure of the light source unit in the second embodiment according to the present invention.

Moreover, the second embodiment illustrates a case where the transmittance tunable filter 38 is provided between the rotating mirror 4 and the slit 10 as shown in FIG. 6B. The present invention should not be limited to this embodiment. As described in FIG. 6D, for example, the filter 38 may be arranged in the back of the rotating mirror 4. In the latter case, the slit light per se is swept by the rotating mirror 4 and the transmittance tunable filter 38a itself is fixed.

The above embodiment further illustrates a case where the time at which reflected light is incident is specified. However, the present invention should not be limited to this embodiment. It is possible to specify, from the respective pixel values of the image data obtained by the image pick-up means, the light projection direction θ corresponding to the time at which the reflected light is incident on a pixel corresponding to the pixel value, based on a predetermined rule (such as, for example, the relationship between the incident time t and the projection direction θ). Using the specified projection direction θ, the distance to the subject may be calculated.

Further, the above embodiment illustrates a case where the composition ratio of two types of light beams is changed with the times based on the predetermined rule (see FIG. 3B). The present invention should not be limited to the above case. The intensity of one type of the light beam may be changed. That is to say, in the latter case, there is provided change control means for changing the projection direction and the light intensity based on the preset correspondence rule between the changes of the projection direction of light and the changes of the intensity of the light. In this case, the state in which the intensity of light changes may be, but not limited to, Ia or Ib shown in FIG. 3A. Namely, as long as the relationship between the light intensity of the projected light and the projection angle is determined univocally, light intensity may be changed in any manner. The range finder with this structure (or an apparatus for measuring distance information about the subject) is suited for distance measurement for a subject having relatively high reflectance as in the case of the subject having a whitish surface or a subject having the light intensity of the reflected light on the surface thereof which does not substantially change compared with the light intensity of the irradiated light.

Lastly, the above embodiment illustrates a case where changes in optical characteristics such as the light intensity, the light intensity ratio and light wavelengths with the times as shown in FIGS. 3A, 3B and 6C. The present invention should not be limited to the above case. As long as the relationship between the optical characteristics of the projected light and projected angle is determined univocally, the optical characteristics may be changed in any manner.

In this embodiment, with the above-stated structure, it is possible to realize a range finder capable of dispensing with special sensors for providing the photosensors with time-measuring functions and of easily measuring a distance at real-time, respectively, only with known photosensors. Besides, the known sensor with a simple structure without a timer function can be utilized, and it is therefore possible to make a circuit space smaller.

As is obvious from the above-stated description given so far, the present invention has an advantage in that it is possible to measure a distance to the subject at real-time with a far simpler structure than the conventional apparatus.

What is claimed is:

1. A range finder comprising:
    light source means having a light source for emitting light onto a subject, for sweeping a light projection direction from the light source;
    change control means for changing said light projection direction and characteristics of the light based on a preset correspondence rule between changes of said light projection direction and changes of said characteristics of the light;
    image pick-up means for receiving a reflected light of a light beam emitted onto said subject and for obtaining image data;
    distance calculation means (1) for determining said characteristics of the light from pixel values of the image data obtained by said image pick-up means, (2) for specifying said projection direction of the light which is incident on pixel corresponding to the pixel values based on said rule and result of said determination, and (3) for calculating a distance to said subject while using said specified projection direction.

2. A range finder according to claim 1, wherein said characteristics of light are one of intensity of said light and wavelength characteristics of said light.

3. A range finder comprising:

a light source unit generating a composite light beam from a plurality of light beams having different wavelengths and sweeping a direction in which the composite light beam is projected onto a subject;

change control means for changing the projection direction of said composite light beam and composition ratio of intensities of said plurality of light beams based on a preset correspondence rule between changes of the projection direction and changes of the composition ratio of intensities of said plurality of light beams;

a plurality of optical filters selecting a transmitted light beam in accordance with wavelength characteristics of said plurality of light beams reflected by said subject;

image pick-up devices arranged in accordance with said plurality of optical filters, respectively;

a distance calculation unit (1) for determining said composition ration of intensities of the plurality of the light beam from pixel values of the image data obtained by each said image pick-up means, (2) for specifying said projection direction of the composite light beam which is incident on pixel corresponding to the pixel values based on said rule and result of said determination, and (3) for calculating a distance to said subject while using said specified projection direction.

4. A range finder according to claim 3, wherein said light source unit has a first period serving as a period in which said composite light is changed into slit light and sweeping the slit light, and a second period in which a composition ratio of said plurality of intensities of light beams does not change with the times, the composite light beam being projected onto an entirety of said subject during said first and second periods;

said change control means controls said light source unit such that the both first and second periods are alternately repeated with the times;

said distance calculation unit calculates reflectance of a surface of said subject from pixel values of image data obtained from said image pick-up devices, and utilizes calculation results for specifying said projection direction.

5. A range finder according to claim 4, wherein the wavelength of said emitted light beam is set in a range other than a visible range;

another image pick-up device for picking up a texture image of said subject simultaneously with pick-up operation by said image pick-up devices; and texture information about said subject is outputted simultaneously with information about a distance to said subject.

6. A range finder according to claim 4, wherein said change control means sets a period in which distance measurement is conducted and a period in which distance measurement is not conducted in a time-division manner;

in said period in which distance measurement is not conducted, emission of said light by said light source unit is stopped, a texture image of said subject is picked up by said image pick-up devices and said texture information is outputted simultaneously with information about a distance to said object.

7. A range finder according to claim 4, wherein said light source unit varies said change of a composition ratio of said plurality of light beams for every measurement period.

8. A range finder according to claim 3, wherein the wavelength of said emitted light beam is set in a range other than a visible range;

another image pick-up device for picking up a texture image of said subject simultaneously with pick-up operation by said image pick-up devices; and texture information about said subject is outputted simultaneously with information about a distance to said subject.

9. A range finder according to claim 3, wherein said change control means sets a period in which distance measurement is conducted and a period in which distance measurement is not conducted in a time-division manner;

in said period in which distance measurement is not conducted, emission of said light by said light source unit is stopped, a texture image of said subject is picked up by said image pick-up devices and said texture information is outputted simultaneously with information about a distance to said object.

10. A range finder according to claim 3, wherein said light source unit varies said change of a composition ratio of said plurality of light beams for every measurement period.

11. A range finder comprising:

a light source unit sweeping a projection direction of a light beam projected onto a subject;

change control means for changing said light projection direction and wavelength characteristics of said projected light beam based on a preset correspondence rule between changes of said projection direction and changes of said wavelength characteristics;

a plurality of optical filters for photo-decomposing a light beam emitted from said light source unit, reflected by said subject and incident on pixels;

image pick-up devices for obtaining image data from images photo-decomposed by said plurality of optical filters;

a distance calculation unit (1) for determining said wavelength characteristics of the light beam from pixel values of the image data obtained by said image pick-up means, (2) for specifying said projection direction of the light which is incident on pixel corresponding to the pixel values based on said rule and result of said determination, and (3) for calculating a distance to said subject while using said specified projection direction.

12. A range finder according to claim 11 wherein said light source unit has a first period serving as a period for changing said light beam into slit light and sweeping the slit light, and a second period in which wavelength characteristics and intensity of said light beam do not change with the times;

said change control means controls said light source unit such that the first and second periods are alternately repeated with the times;

said distance calculation unit calculates reflectance of a surface of said subject from pixel values of image data obtained from said respective image pick-up devices in said second period, and utilizes calculation results for specifying said projection direction.

13. A range finder according to claim 12, wherein the wavelength of said emitted light beam is set in a range other than a visible range;

another image pick-up device for picking up a texture image of said subject simultaneously with pick-up operation by said image pick-up devices; and texture information about said subject is outputted simultaneously with information about a distance to said subject.

14. A range finder according to claim 12, wherein said change control means sets a period in which distance measurement is conducted and a period in which distance measurement is not conducted in a time-division manner;

in said period in which distance measurement is not conducted, emission of said light by said light source unit is stopped, a texture image of said subject is picked up by said image pick-up devices and said texture information is outputted simultaneously with information about a distance to said object.

15. A range finder according to claim 12, wherein said light source unit varies said change of wavelength characteristics of said light beams for every measurement period.

16. A range finder according to claim 11, wherein the wavelength of said emitted light beam is set in a range other than a visible range;

another image pick-up device for picking up a texture image of said subject simultaneously with pick-up operation by said image pick-up devices; and texture information about said subject is outputted simultaneously with information about a distance to said subject.

17. A range finder according to claim 11, wherein said change control means sets a period in which distance measurement is conducted and a period in which distance measurement is not conducted in a time-division manner;

in said period in which distance measurement is not conducted, emission of said light by said light source unit is stopped, a texture image of said subject is picked up by said image pick-up devices and said texture information is outputted simultaneously with information about a distance to said object.

18. A range finder according to claim 11, wherein said light source unit varies said change of wavelength characteristics of said light beams for every measurement period.

* * * * *